United States Patent
Ganesan (10) Patent No.: US 11,848,111 B2
(45) Date of Patent: Dec. 19, 2023

(54) DOUBLE CONTAINMENT NUCLEAR POWER REACTOR WITH PASSIVE COOLING AND RADIATION SCRUBBING

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 231 days.

(21) Appl. No.: 17/138,217

(22) Filed: Dec. 30, 2020

(65) Prior Publication Data

US 2022/0215975 A1 Jul. 7, 2022

(51) Int. Cl.
| G21C 15/18 | (2006.01) |
| G21C 11/02 | (2006.01) |
| G21C 13/10 | (2006.01) |
| G21C 15/12 | (2006.01) |
| G21C 13/02 | (2006.01) |
| G21D 5/08  | (2006.01) |

(52) U.S. Cl.
CPC ............. *G21C 15/18* (2013.01); *G21C 11/02* (2013.01); *G21C 13/022* (2013.01); *G21C 13/10* (2013.01); *G21C 15/12* (2013.01); *G21D 5/08* (2013.01)

(58) Field of Classification Search
CPC ........ G21C 11/02; G21C 11/04; G21C 13/02; G21C 13/022; G21C 13/093; G21C 13/10; G21D 5/08
See application file for complete search history.

(56) References Cited

U.S. PATENT DOCUMENTS

| 4,851,183 A | 7/1989 | Hampel | |
| 9,378,855 B2 | 6/2016 | Ganesan | |
| 9,396,823 B2 | 7/2016 | Ganesan | |
| 9,502,143 B2 | 11/2016 | Ganesan | |
| 10,170,209 B2 | 1/2019 | Ganesan | |
| 10,685,751 B2 | 6/2020 | Ganesan | |
| 10,714,221 B2 | 7/2020 | Ganesan | |
| 2012/0213322 A1* | 8/2012 | Naito | G21C 15/182 376/282 |
| 2013/0051511 A1* | 2/2013 | Watson | G21D 1/02 376/404 |
| 2014/0010340 A1 | 1/2014 | Nilsson | |
| 2015/0131769 A1 | 5/2015 | Larrion | |

(Continued)

OTHER PUBLICATIONS

Iaea. "Construction Technologies for Nuclear Power Plants". Whitepaper, Online, Nov. 30, 2011, Fig. 34, pp. 45, 46, 122.

(Continued)

*Primary Examiner* — Sharon M Davis
(74) *Attorney, Agent, or Firm* — Suiter Swantz PC LLO (57) ABSTRACT

A nuclear power reactor which includes passive cooling and radiation scrubbing. The reactor includes a first containment member which is buried in the ground. A second containment member is positioned in the first containment member and has a reactor vessel therein. The discharge side of the reactor vessel is connected to a heat exchanger which drives a turbine which drives a device such as a generator. A source of water is provided which gravity feeds cooling water to the interior of the first containment member in the event of reactor overheating or over-pressurization. A radiation scrubber is provided for scrubbing radiation which may be in the first containment member or the second containment member.

14 Claims, 8 Drawing Sheets

(56) References Cited

U.S. PATENT DOCUMENTS

2015/0357060 A1\* 12/2015 Malloy, III ............ G21C 13/10
376/293
2018/0322969 A1\* 11/2018 Stellwag ................... C02F 5/10

OTHER PUBLICATIONS

Search Report and Written Opinion in International Application No. PCT/US2021/63077 dated Mar. 25, 2022, 16 pages.

\* cited by examiner

DOUBLE CONTAINMENT NUCLEAR POWER REACTOR WITH PASSIVE COOLING AND RADIATION SCRUBBING

BACKGROUND OF THE INVENTION

Field of the Invention

This invention relates to a nuclear power reactor. More particularly, this invention relates to an underground nuclear power reactor. Even more particularly, this invention relates to an underground double containment nuclear power reactor with passive cooling and radiation scrubbing.

Description of the Related Art

Many types of nuclear power reactors have been provided for supplying the necessary cooling water for the reactor and to provide emergency heat exchange systems to the reactor in the event of reactor overheating. Further, reactor systems have been provided to protect the reactor in the event of war or terrorism. Applicant has previously received several patents which represent significant advances in the nuclear reactor art. See for example, U.S. Pat. Nos. 9,378,855 B2; 9,396,823 B2; 9,502,143 B2; 10,170,209; 10,685,751 B2; and 10,714,221.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Three different embodiments of the double containment nuclear power reactor with passing cooling and radiation scrubbing are disclosed with each of the embodiments being completely buried in the ground.

In the first embodiment, the invention includes a first containment member having a bottom wall having a first end, a second end, a first side, a second side, an upper side and a lower side. The first containment member also includes an upstanding first end wall having a lower end, an upper end, an inner side, an outer side, a first end and a second end with the first end wall extending upwardly from the first end of the bottom wall. The first containment member also includes an upstanding second end wall having a lower end, an upper end, an inner side, an outer side, a first end and a second end with the second end wall extending upwardly from the second end of the bottom wall. The first containment member also includes an upstanding first side wall having a lower end, an upper end, an inner side, an outer side, a first end and a second end with the first side wall extending upwardly from the first side of the bottom wall. The first containment member also includes an upstanding second side wall having a lower end, an upper end, an inner side, an outer side, a first end and a second end with the second side wall extending upwardly from the second side of the bottom wall. The first containment member also includes an upper wall which extends between the upper ends of the first end wall, the second end wall, the first side wall and the second side wall so that the first containment member defines an interior compartment therebetween. The upper wall of the first containment member is located below the ground level so that the first containment member is completely buried in the ground. In the first embodiment, the first containment member is comprised of a single layer of a concrete material. The first embodiment may include an optional tank which is positioned in the interior compartment of the first containment member. The optional tank is identical to the barge disclosed in U.S. Pat. Nos. 10,170,209; 10,685,751 B2; and 10,714,221 except that the tank of the first embodiment does not float but is positioned on the bottom wall of the first containment member. The optional tank includes a bottom wall, a first end wall, a first side wall, a second side wall, an open second end, and an open upper end.

The first embodiment also includes an upstanding second containment member positioned in the interior of the first containment member with the second containment member having a cylindrical body portion, an upper section and a lower section with the second containment member defining an interior compartment. The second containment member closes the open second end of the tank if the optional tank is used.

An upstanding nuclear reactor vessel is positioned in the interior compartment of the second containment member with the nuclear reactor vessel having upper and lower ends. The nuclear reactor vessel has an interior compartment formed therein with the interior compartment of the nuclear reactor vessel having a fluid therein and rods therein. The second containment member and the nuclear reactor vessel are spaced-apart to define an interior compartment therebetween with the interior compartment having an upper end and a lower end. The interior compartment of the first containment member is in valved fluid communication with a source of water. The interior compartment of the second containment member is in valved fluid communication with a source of water. In the preferred embodiment, the source of water is above the nuclear reactor vessel so that cooling water may be supplied to the interior of the second containment member by gravity. Should the reactor vessel become overheated or over-pressurized, cooling water is supplied from the source of water to the interior compartment of the second containment member.

In a second embodiment of the invention, the first containment member is comprised of first and second layers of concrete with a flexible and water impervious material therebetween.

In a third embodiment of the invention, the bottom wall of the first containment member has a plurality of off-set and spaced-apart expansion joints formed therein.

The principal object of the invention is to provide a double containment nuclear power reactor with passive cooling and radiation scrubbing.

A further object of the invention is to provide a greater level of protection for the reactor from bombing, missile attacks or an aircraft crash.

A further object of the invention is to provide a greater level of radiation protection for the public.

A further object of the invention is to provide a simplified passive cooling system for a double containment nuclear power reactor.

A further object of the invention is to provide a double containment nuclear power reactor with passive cooling and radiation scrubbing wherein the reactor thereof is positioned on the floor of the first containment member.

A further object of the invention is to provide a double containment nuclear power reactor with passive cooling and radiation scrubbing which decreases the potential of radiation exposure to the public.

A further object of the invention is to provide a double containment nuclear power reactor with passive cooling and radiation scrubbing wherein a plurality of backup valves are provided.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855 B2; 9,396,823 B2; 9,502,143 B2; 10,170,209; 10,685,751 B2 and 10,714,221 relating to nuclear power reactors. Although Applicant's earlier patents relate to floating nuclear power reactors and the instant invention relates to an underground double containment nuclear power reactor, Applicant hereby incorporates the disclosures of the above-identified patents in their entirety by reference thereto to complete this disclosure if necessary. Further, as used herein, the term fluid may include steam.

Figure 1:
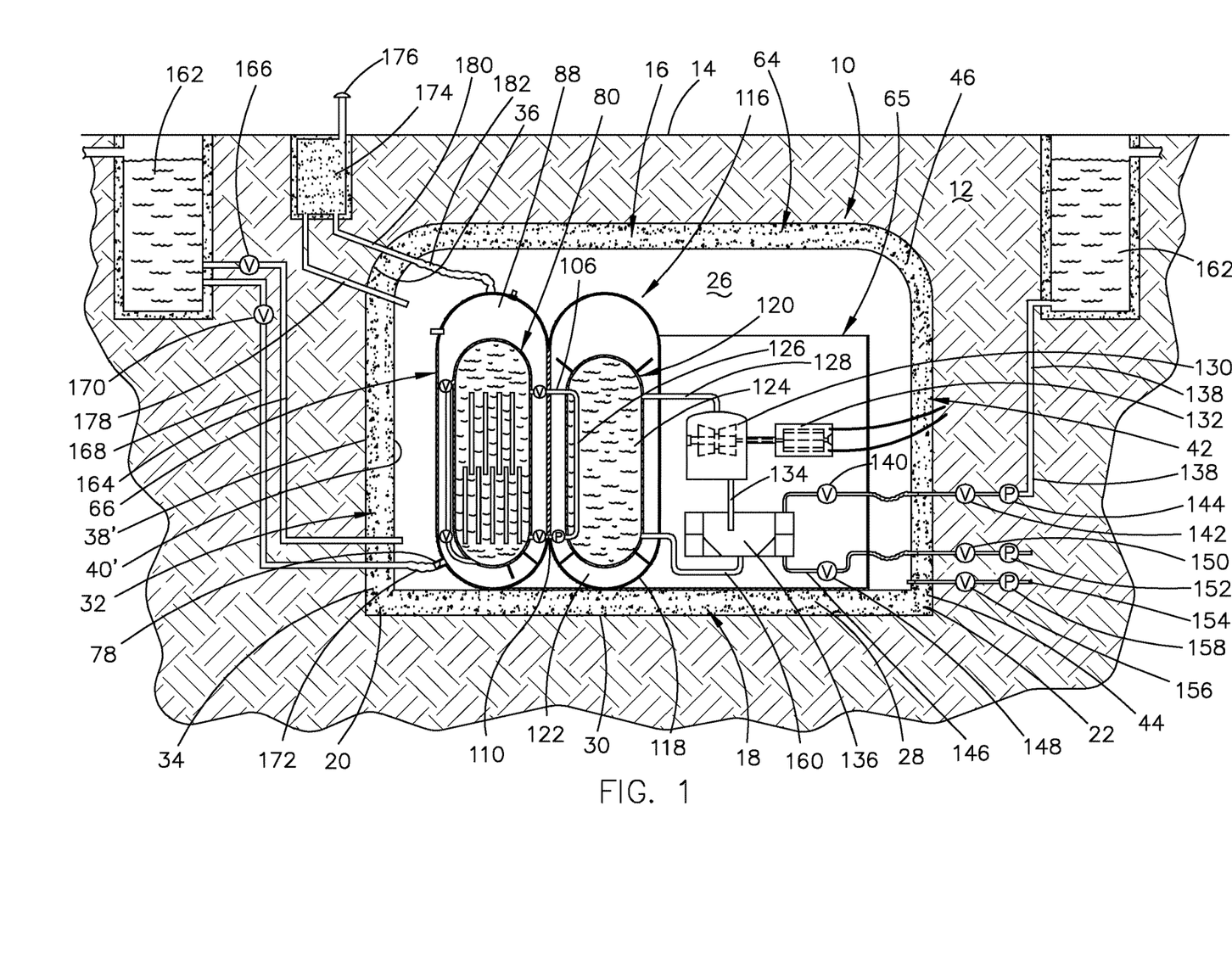
FIG. 1 is a sectional view of the first embodiment of the invention.

The underground double containment nuclear power reactor of this invention is referred to by the reference numeral 10 (FIG. 1). The ground in which the underground double containment nuclear power reactor 10 is buried will be referred to by the reference numeral 12 with the ground level or upper surface thereof being referred to by the reference numeral 14.

The underground double containment nuclear power reactor 10 includes a first containment member 16. Containment member 16 includes a bottom wall 18 having a first end 20, a second end 22, a first side 24, a second side 26, an upper side 28 and a lower side 30. An upstanding first end wall 32, having a lower end 34, an upper end 36, a first end 38 and a second end 40. As seen, end wall 32 has an outer side 38' and an inner side 40'. An upstanding second end wall 42, having a lower end 44, an upper end 46, a first end 48 and a second end 50, extends upwardly from end 22 of bottom wall 18. As seen, end wall 42 has an outer side 50' and an inner side 48'.

An upstanding first side wall 52, having a first end 54 and a second end 56, extends upwardly from the first side 24 of bottom wall 18. The end 54 of side wall 52 is joined to the end 38 of end wall 32. The end 56 of side wall 52 is joined to the end 48 of end wall 42.

An upstanding second side wall 58, having a first end 60 and a second end 62, extends upwardly from the second side 26 of bottom wall 18. The end 60 of side wall 58 is joined to the end 40 of end wall 32. The end 62 of side wall 58 is joined to the end 50 of end wall 42.

Figure 3:
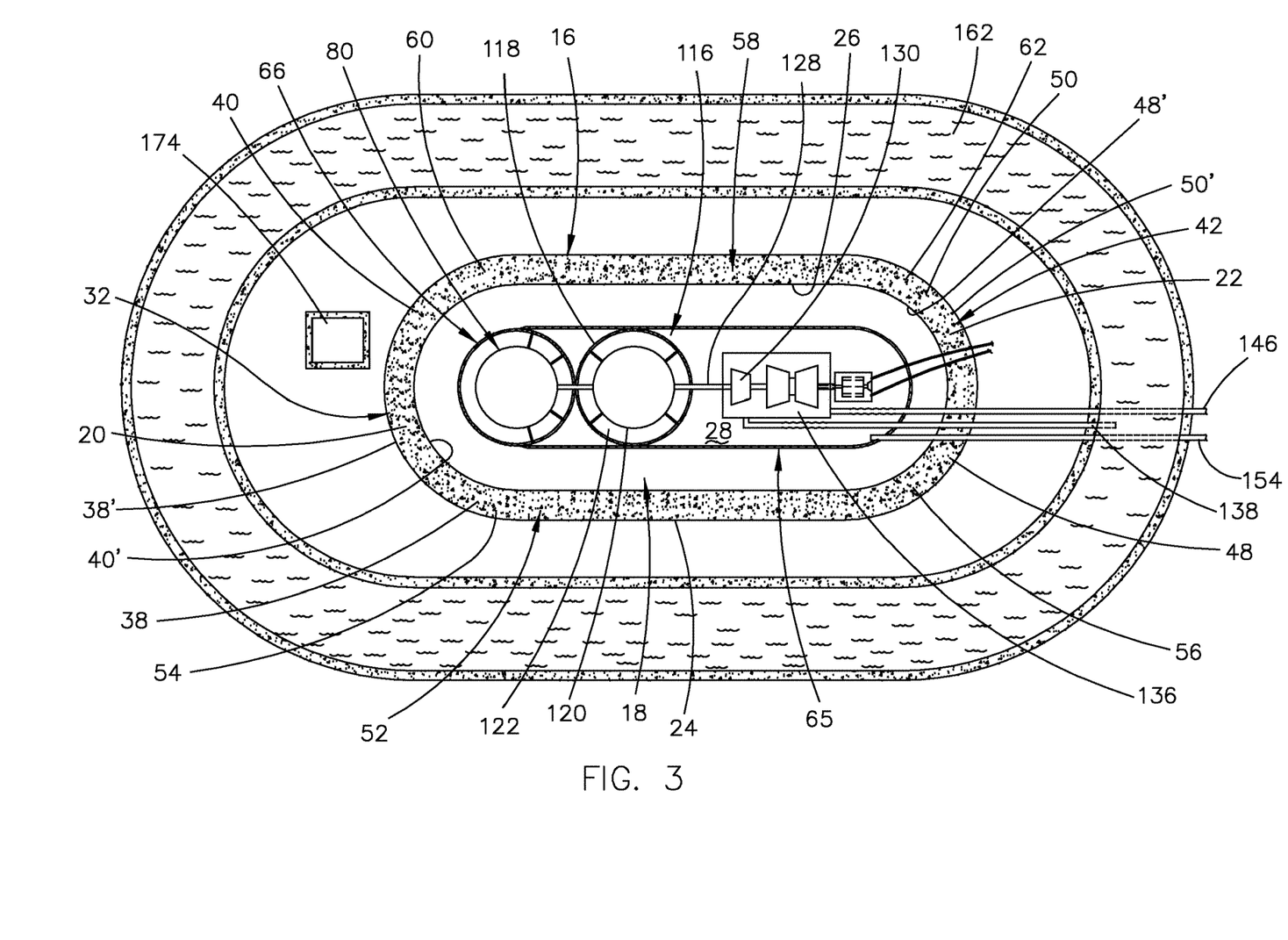
FIG. 3 is a partial sectional top view of the first embodiment of the invention.
Figure 3A:
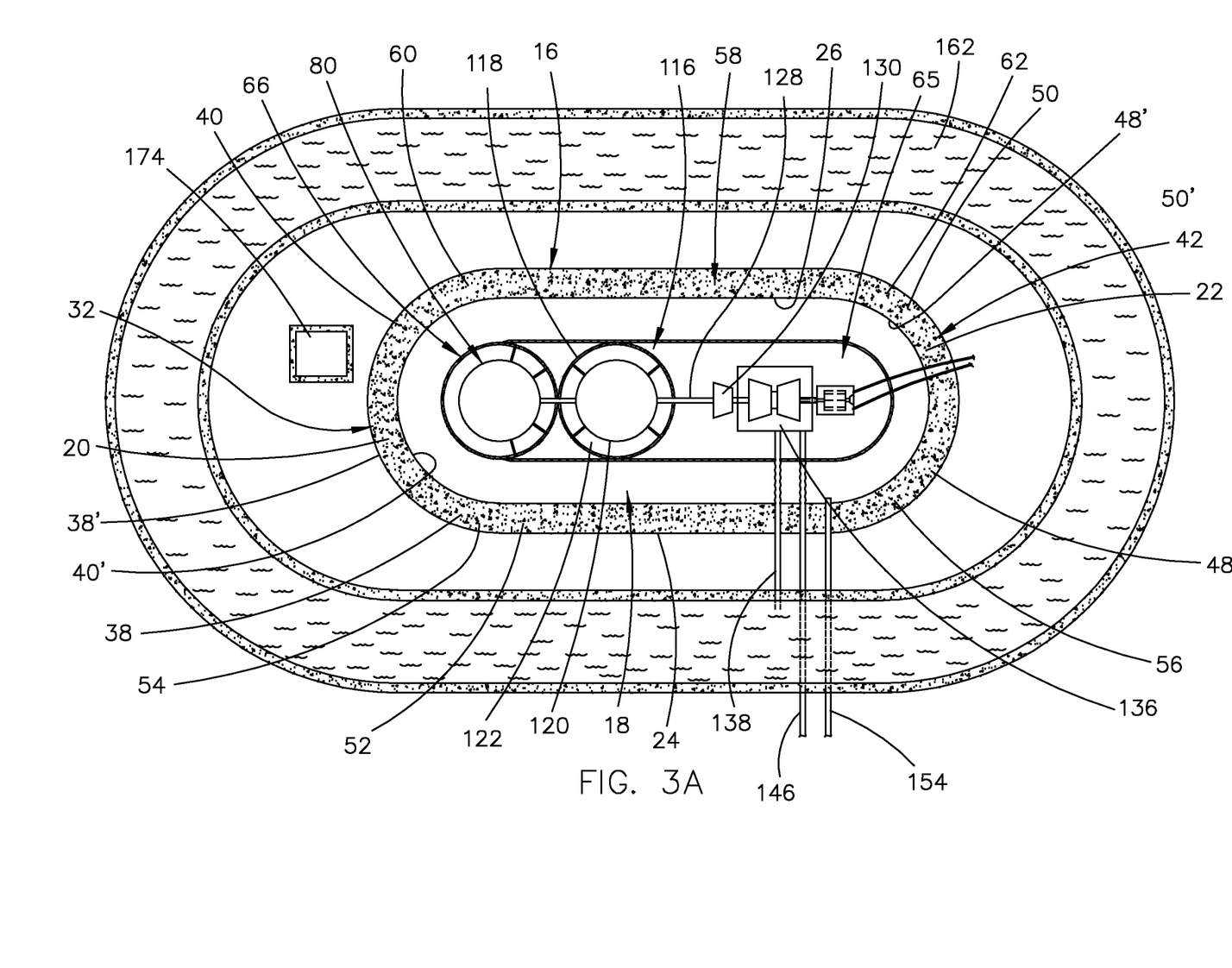
FIG. 3A is a partial sectional top view of the first embodiment of the invention wherein certain of the tubes thereof extend through the side of the first containment member rather than the end of the first containment member as depicted in FIG. 3.
Figure 4:
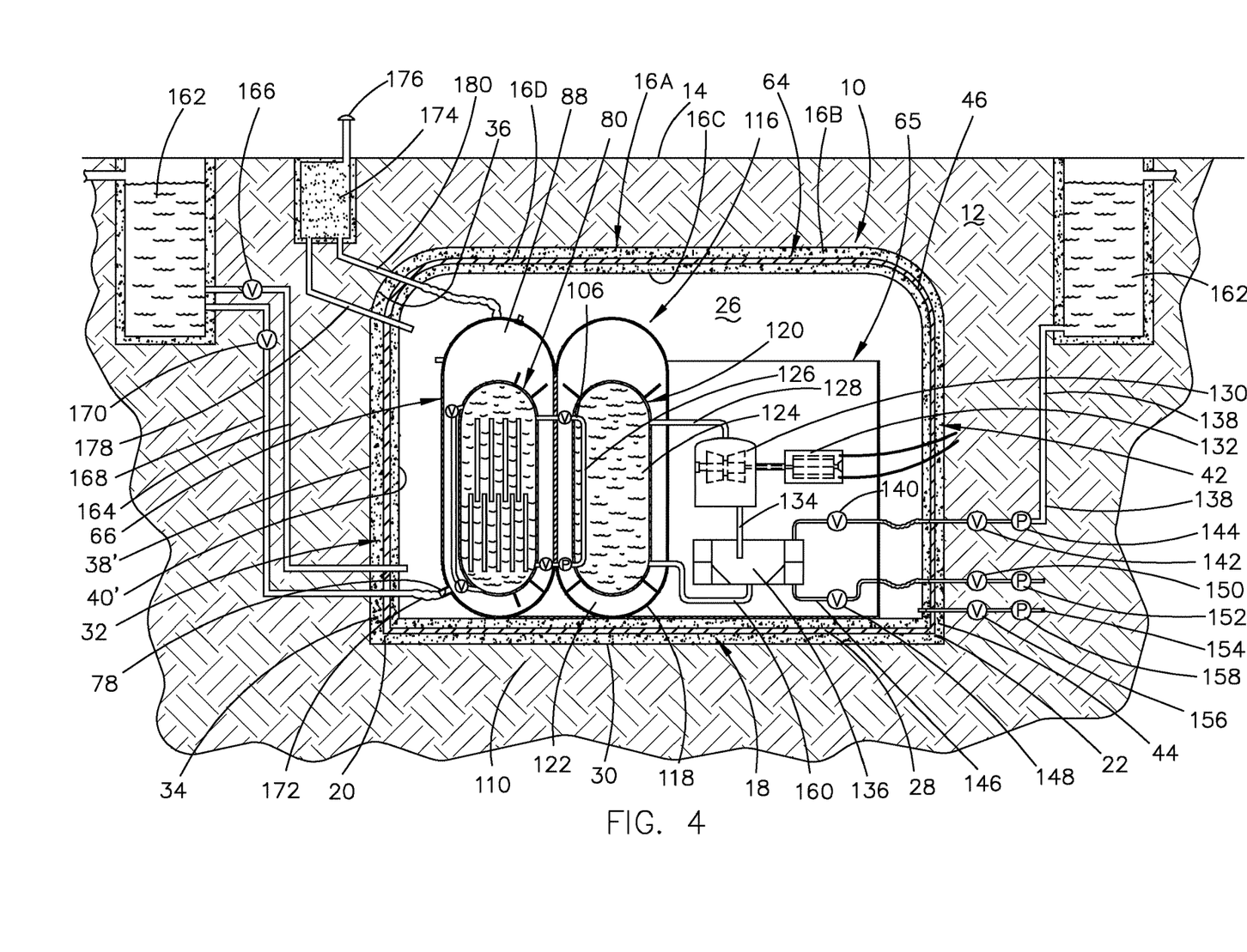
FIG. 4 is a sectional view of a second embodiment of the invention which is identical to the first embodiment of the invention of FIG. 1 except that the first containment member is comprised of two layers of concrete having a flexible and water impervious material therebetween.
Figure 5:
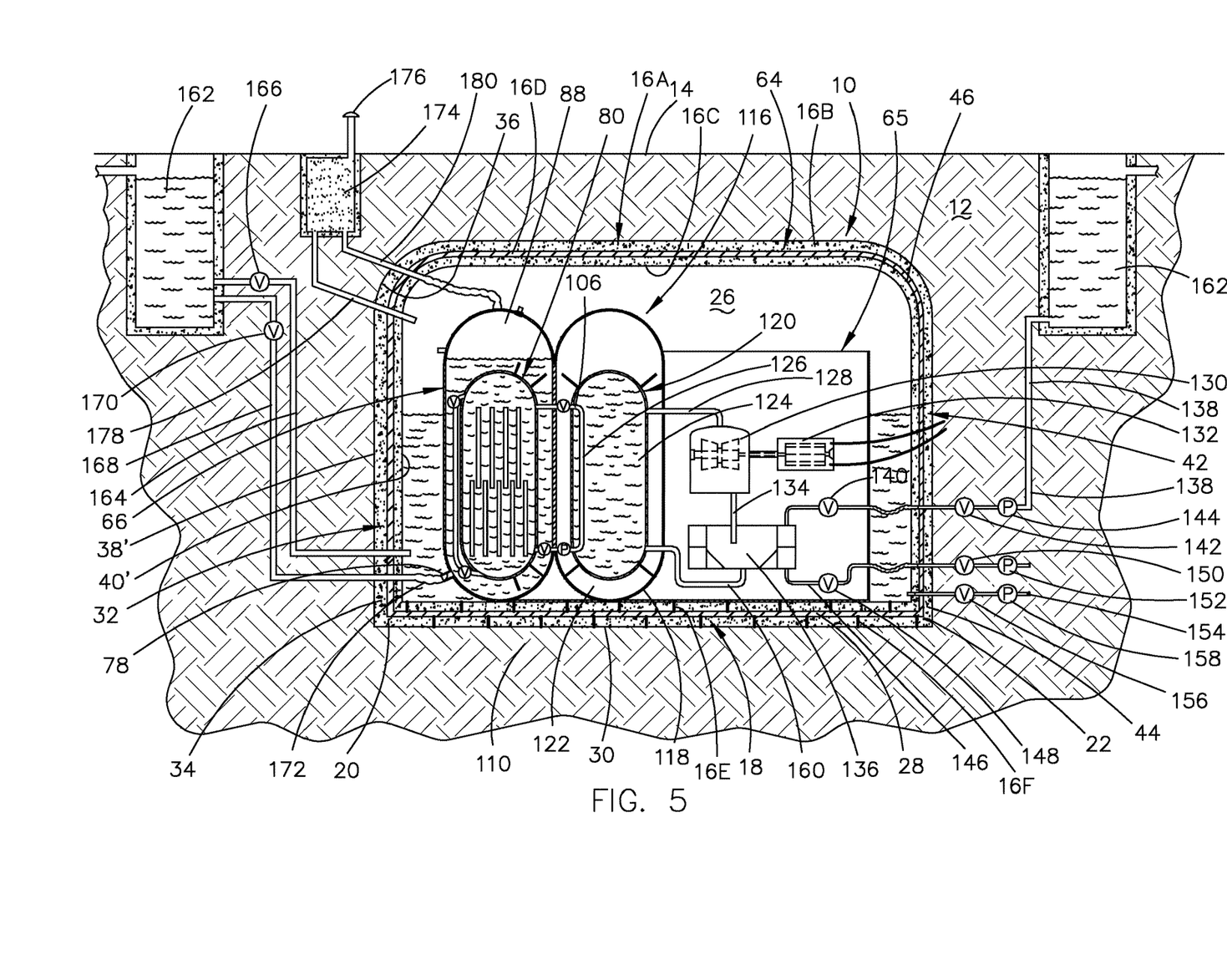
FIG. 5 is a sectional view of a third embodiment of the invention which is identical to FIG. 4 except the concrete bottom wall of the first containment member has a plurality of off-set and spaced-apart expansion joints formed in the two layers of concrete.
Figure 6:
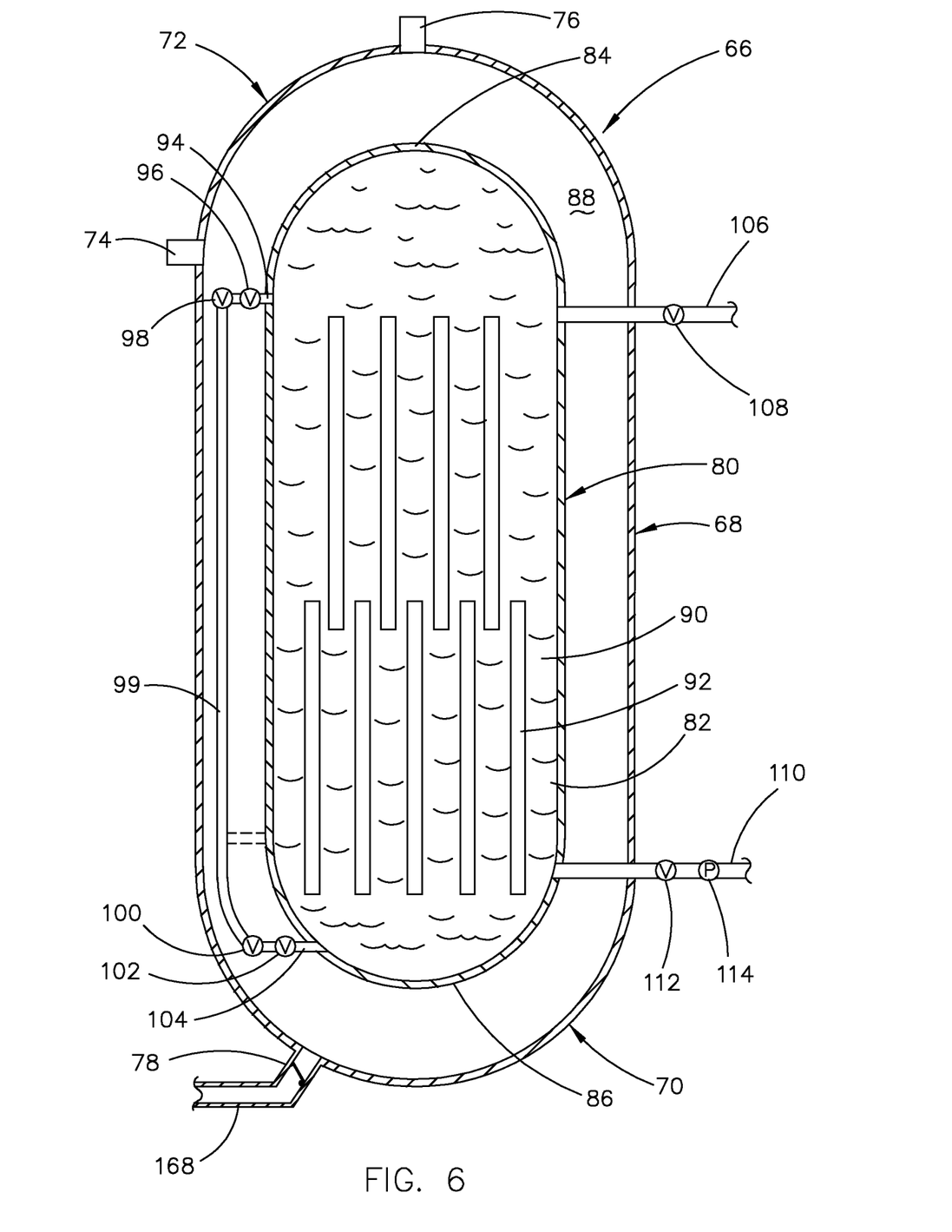
FIG. 6 is a partial vertical sectional view of the second containment member and the reactor vessel therein.
Figure 7:
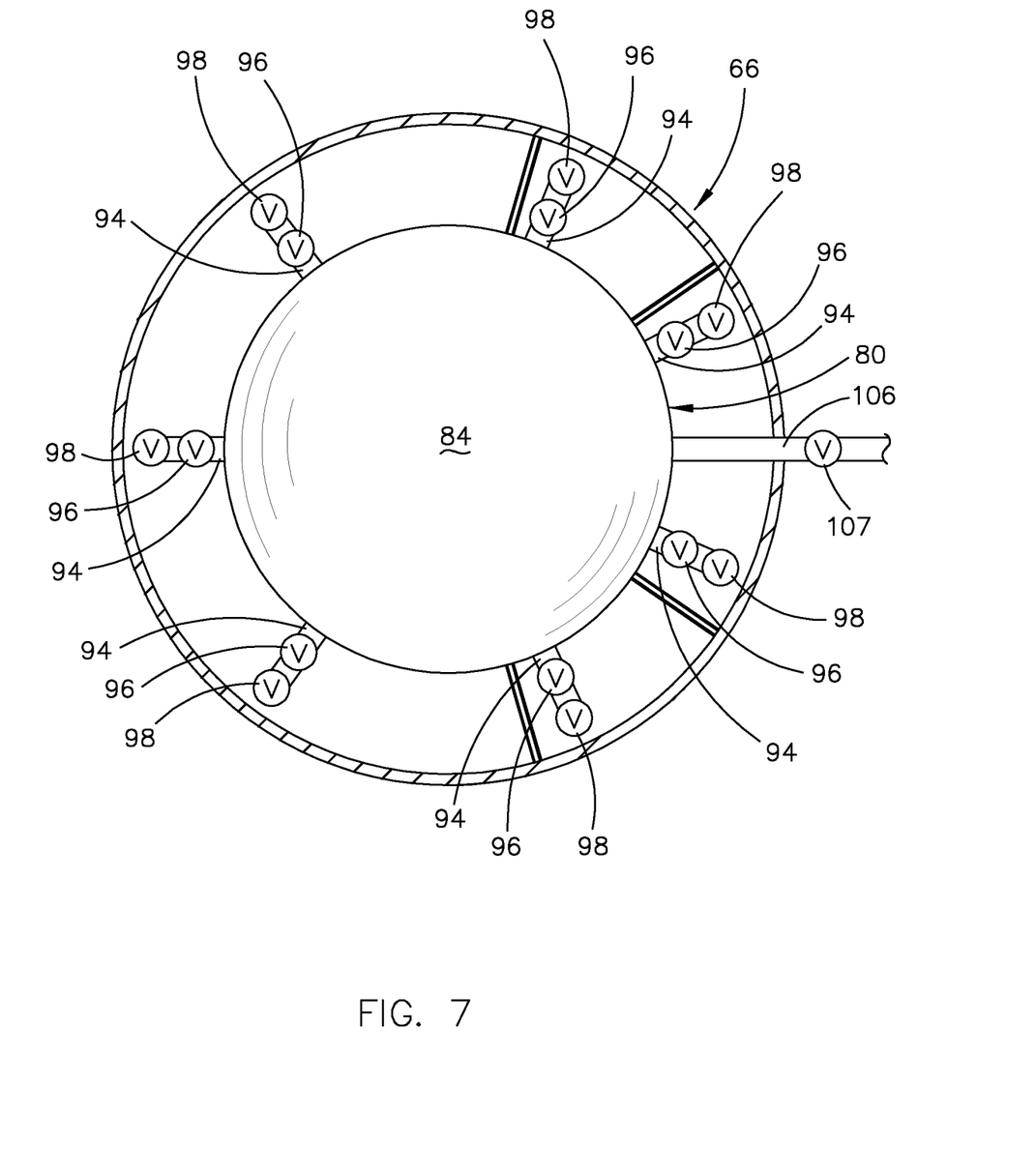
FIG. 7 is a partial horizontal top sectional view of the second containment member having the reactor vessel therein.

The numeral 64 refers to the top wall or roof of the first containment member 16 which is positioned on the upper end 36 of end wall 32, the upper end 46 of end wall 42, the upper end of side wall 52 and the upper end of side wall 58 and is joined thereto. As seen, the top wall or roof 64 is located below the upper surface or ground level 14 and is completely buried in the ground 12 which provides protection against air strikes, missile strikes, or other acts of terror or war. As seen in FIGS. 3 and 3A, the containment member 16 may have an oblong configuration as viewed from the upper end thereof or it may have a rectangular shape such as seen in FIG. 1. If the rectangular configuration is employed, rounded portions may be provided on the upper ends of the side walls and end walls of the containment member 16.

The first containment member 16 is preferably comprised of concrete but could be comprised of steel or the like. As will be shown in the drawings, some other versions of the single layer of concrete of FIG. 1 could be employed. The numeral 65 refers to an optional tank or frame which is positioned in the interior of containment member 16. Tank 65 is identical to the barge 32 described and shown in U.S. Pat. No. 10,685,751 and will not be described in detail other than to describe that the tank 65 has a bottom wall, a first end wall, a first side wall, a second side wall, an open second end and an open upper end. Tank 65 is comprised of a metal material such as stainless steel, steel, iron, aluminum or other suitable material.

An upstanding second containment member 66 is positioned in the interior of the first containment member 16 and in the tank 65 as seen in the drawings. Containment member 66 is preferably comprised of steel but could be formed with other materials. Containment member 66 will be described as having a generally cylindrical body section 68, a lower section 70 and an upper section 72. Containment member 66 closes the open second end of the tank 65 just like the nuclear reactor 59 closes one end of the barge 32 in U.S. Pat. Nos. 10,170,209; 10,685,751; and 10,714,221.

Containment member 66 has a water outlet 74 secured thereto in the upper section 72 thereof. Containment member 66 also has an exhaust outlet 76 formed therein in the upper section 72 thereof as will be described in more detail hereinafter. Containment member 66 also has a one-way water inlet opening or pipe 78 formed in the lower section 70 thereof. As seen, the lower end of the containment member 66 is positioned on the upper side of the bottom wall of the tank 65, if the optional tank 65 is utilized, which is positioned on the upper side 28 of bottom wall 18 of containment member 16. If the optional tank 65 is not utilized, the lower end of containment member 66 will be positioned on the upper side 28 of bottom wall 18 of containment member 16.

The numeral 80 refers to a nuclear reactor vessel which is positioned in containment member 66 and which has an interior compartment 82. For purposes of description, reactor vessel 80 will be described as having an upper end 84 and a lower end 86. Reactor vessel 80 is spaced from containment member 66 to define an interior compartment 88 therebetween. Interior compartment 82 of reactor vessel 80 contains fluid 90 and rods 92 in conventional fashion. The water inlet opening 78 is in fluid communication with the interior compartment 88. The water outlet opening 74 is in fluid communication with the interior of containment member 16.

Vessel 80 is provided with a plurality of radially spaced-apart tubes 94 which extend outwardly from reactor vessel 80 in the upper section of reactor vessel 80. Valves 96 and 98 are imposed in each of the tubes 94. An elongated and vertically disposed cooling tube 99 extends downwardly from the outlet side of each of the valves 98 in interior compartment 88. A pair of valves 100 and 102 are imposed in the lower ends of each of the cooling tubes 99. The discharge side of each of the valves 102 is in communication with a pipe 104 which is in communication with the interior compartment 82 of vessel 80.

A tube 106 extends from vessel 80 below the upper end 84 of vessel 80 and extends outwardly through containment member 68 and has a valve 108 imposed therein. A tube 110 extends from vessel 80 at the lower end thereof with the inner end of tube 110 being in fluid communication with the interior compartment 82 of vessel 80. A valve 112 and an electric pump 114 are imposed in tube 110. The reason for having the two valves 96 and 98 connected to each of the tubes 94 is to provide a back-up valve if one of the two valves malfunction. The reason for having the two valves 100 and 102 connected to each of the tubes 104 is to provide a back-up valve if one of the two valves malfunctions.

The number 116 refers to an upstanding heat exchanger which is positioned adjacent containment member 66 as seen in the drawings. Heat exchanger 116 includes an upstanding outer support 118, the lower end of which rests on the bottom wall of the tank 65 if tank 65 is used. If tank 65 is not used, the lower end of the heat exchanger 116 rests on the bottom wall 18 of containment member 16. A vessel 120 is positioned within outer support 118. Outer support 118 and vessel 120 define an interior compartment 122 therebetween. In some cases, the outer support 118 may not be necessary. At any rate, fluid 124 is contained in vessel 120.

The tubes 106 and 110, which extend from the interior of vessel 80, extend outwardly through containment member 66, through the outer support 118 of heat changer 116 and into the interior of vessel 120 and are connected to a vertically disposed tube 126 which is positioned in the interior of vessel 120.

Referring now to the drawings, a tube 128 extends from the upper end of vessel 120, through outer support 118 to a conventional turbine 130 which drives a device 132 such as a generator. A tube 134 extends from turbine 130 to a conventional condenser 136. A water input line 138 extends from condenser 136 and has valves 140 and 142 imposed therein. Line 138 also has an optional pump 144 imposed therein. Line 146 extends from condenser 136 outwardly through end wall 42 of containment member 16 into the ground 12. Line 146 has valves 148 and 150 imposed therein. Line 146 also has an optional pump 152 imposed therein.

The numeral 154 refers to a tube which extends outwardly through end wall 42 of containment member 16 into the ground 12. Tube 154 has a valve 156 imposed therein and an optional pump 158 imposed therein. Tube 160 extends from condenser 136 to the interior compartment 124 of vessel 120 of heat exchanger 116.

The structure of FIG. 3A is identical to the structure of FIG. 3 except that the tubes 138, 146 and 154 go outwardly through the side wall 52 of containment member 16 rather than the end wall 42 of containment member 16.

Line or tube 138 extends from condenser 136 to a source of water 162 which is positioned at ground level 14 and below. Water 162 may be a singular tank or an oblong body of water such as seen in FIGS. 3 and 3A. As seen, the source of water 162 is concrete lined. With respect to line 138, the force of gravity should supply the needed water to condenser 136 but pump 144 ensures that an adequate amount of water will be supplied to condenser 136.

As seen in FIG. 1, line or tube 164 fluidly connects the source of water 162 with the interior of containment member 16. Line 164 has a valve 166 imposed therein. As also seen in FIG. 1, a line or tube 168 fluidly connects the source of water 162 and the inlet pipe 78 to supply cooling water to the interior compartment 88 of containment member 66. A valve 170 is imposed in line 168. Line 168 also includes a flexible or slack portion 172.

The numeral 174 refers to a conventional radiation scrubber having a vent 176. Tube 178 connects radiation scrubber 174 to the interior of containment member 16 as seen in FIG. 1. Line 180 connects radiation scrubber 174 to the outlet pipe 76 at the upper end of containment member 66. Line 180 includes a flexible portion 182 therein.

Figure 2:
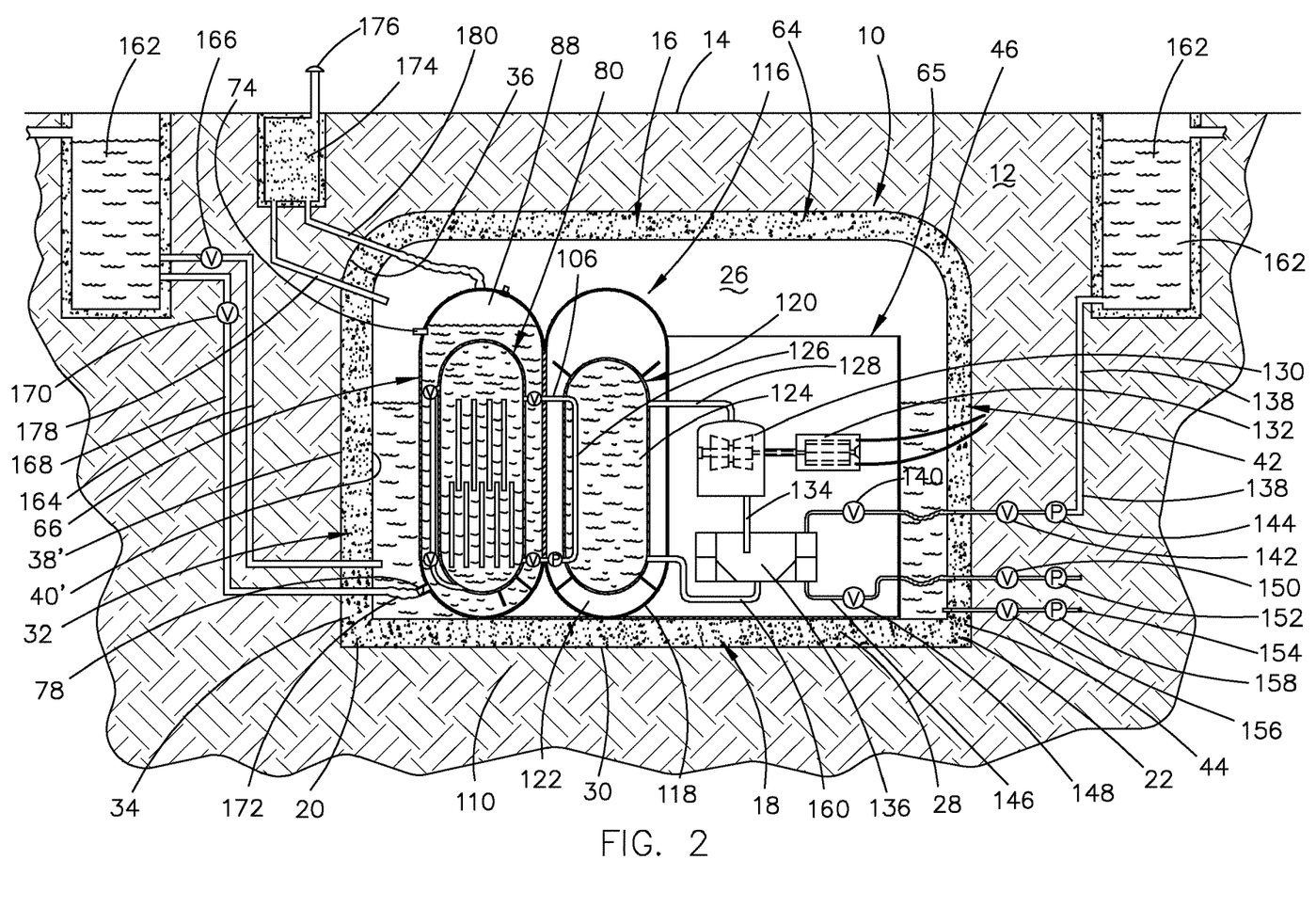
FIG. 2 is a sectional view of the first embodiment of the invention wherein cooling water has been supplied to the interior of the second containment member of the invention by gravity flow.

FIG. 2 is identical to FIG. 1 except that cooling water has been supplied to the interior of compartment 88 of containment member 66, by gravity flow, so as to surround reactor vessel 80. Excess water in compartment 88 will flow outwardly from outlet pipe 74 into the interior of containment member 16. Any radiation fumes in the upper part of containment member 16 will pass upwardly to the radiation scrubber 174 by way of line 178. Any radiation fumes in the upper part of interior compartment 88 will pass upwardly to the radiation scrubber 174 by way of line 180.

When the nuclear reactor of this invention is functioning in a conventional manner, as seen in FIG. 1, the valves 166 and 170 in lines 164 and 168 respectively will be closed. The valves 108 and 112 in lines 106 and 110 respectively will be open and pump 114 in line 110 will be active. The heated fluid or steam created in the interior compartment 82 of reactor vessel 80 will be discharged into the heat exchanger 116 by way of the tube 106. The heated fluid therein will pass through tube 106 and valve 108, through tube 126 and outwardly through the tube 110, pump 114 and valve 112 into the interior of compartment 82 of reactor vessel 80 with the flow being aided by the electric pump 114.

When the nuclear reactor of this invention is functioning in a conventional manner, the valves 96, 98, 100 and 102 will be open so that fluid may pass through the cooling tubes 99. If there is a break in one of the tubes 99, the valves 96, 98, 100 and 102 of the associated tubes 99 will close to avoid loss of fluid from the broken tube 99. The reason for having two valves 96 and 98 at the outer end of each of the tubes 94 is for one of the valves functioning as a back-up valve in the event of one of the valves malfunctioning. The same is also true for having two valves 100 and 102 at the lower end of each of the cooling tubes 99.

The heated fluid or steam 124 in vessel 120 in heat exchanger 116 passes through line 128 to turbine 130 to drive the same in conventional fashion. Turbine 130 drives the device 132 in conventional fashion. The fluid or steam within turbine 130 is discharged therefrom into condenser 136 by way of tube 134. The fluid or steam supplied to condenser 136 is returned to the lower end of vessel 120 by line 160.

If the nuclear reactor becomes overheated or over pressurized, the valve 170 in line 168 will be opened to supply water to flood the interior compartment 88 of containment 66 by gravity. Cooling water in the interior compartment 88 will surround the cooling tubes 99. The valves 96, 98, 100 and 102 are normally open and this allows hot fluid from the interior compartment 82 to circulate from the upper end of interior compartment 82 through cooling tubes 99 to the lower end of interior compartment 82. Heat from the hot fluid in the cooling tubes 99 conducts across the wall of cooling tube 99 to the cold water surrounding cooling tube 99. This cools the fluid inside cooling tube 99. As the fluid cools, it becomes denser than hot fluid and drops down to the lower part of vessel 80. Inside the vessel 80, residual heat from the hot rods 92 heats the fluid making the fluid less dense. Less dense fluid raises and moves to the upper section of vessel 80 and enters the upper end of tube 99 which is surrounded by cold water and cools again inside the cooling tubes 99, thereby creating a convection current cycle. The convection current cycle results in cooling the reactor.

If needed, valve 166 may be opened so that cooling water from the source of water 162 will flood the interior of containment member 16. The level of water within the first containment member 16 will be controlled by the valve 156 and pump 158 in line 154.

In summary, the new features of the instant invention with respect to Applicant's earlier patents are set forth below:

1. The fact that the nuclear reactor of the instant invention is completely underground, protects the nuclear reactor from air strikes, missile strikes, terrorism, etc.

2. The instant invention provides a greater level of radiation protection for the public due to the radiation scrubbing of radiation fumes being discharged from the reactor.

3. The simplified passive cooling system supplies cooling water to the interior of the second containment member thereby cooling the cooling loops therein.

4. The reactor is positioned on the floor of the tank, if the tank is utilized, which is positioned on the floor of the first containment member.

5. If the tank is not utilized, the reactor is positioned on the floor of the first containment member.

6. A plurality of back-up valves are provided.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An underground double containment nuclear reactor, comprising:
   a first containment member including:
   (a) a bottom wall having a first end, a second end, a first side, a second side, an upper side and a lower side;
   (b) an upstanding first end wall having a lower end, an upper end, an inner side, an outer side, a first end and a second end;
   (c) said first end wall extending upwardly from said first end of said bottom wall;
   (d) an upstanding second end wall having a lower end, an upper end, an inner side, an outer side, a first end and a second end;
   (e) said second end wall extending upwardly from said second end of said bottom wall;
   (f) an upstanding first side wall having a lower end, an upper end, an inner side, an outer side, a first end and a second end;
   (g) said first side wall extending upwardly from said first side of said bottom wall;
   (h) an upstanding second side wall having a lower end, an upper end, an inner side, an outer side, a first end and a second end;
   (i) said second side wall extending upwardly from said second side of said bottom wall;
   (j) an upper wall having a first end, a second end, a first side, a second side, a lower side and an upper side;
   (k) said upper wall extending between said upper ends of said first end wall, said second end wall, said first side wall and said second side wall so that said first containment member defines an interior compartment therebetween;
   (l) said upper wall of said first containment member being located below ground level whereby said first containment member is completely buried in the ground;
   (m) said first containment member being comprised of a concrete material;
   an upstanding second containment member positioned in the interior of said first containment member;
   said second containment member having a cylindrical body portion, an upper section and a lower section;
   said second containment member defining a sealed interior compartment;
   said sealed interior compartment of said second containment member being in valved fluid communication with a source of water;
   an upstanding reactor vessel positioned in said sealed interior compartment of said second containment member;
   said nuclear reactor vessel having upper and lower ends;
   said nuclear reactor vessel having an interior compartment formed therein with said interior compartment of said nuclear reactor vessel having a fluid therein;
   said second containment member and said nuclear reactor vessel being spaced-apart to define an air compartment therebetween with said air compartment having an upper end and a lower end;
   an upstanding heat exchanger, having an upper end and a lower end;

a first circulation pipe, having first and second ends, extending from said nuclear reactor vessel through said second containment member and into said heat exchanger;
a second circulation pipe, having upper and lower ends, extending downwardly from said second end of said first circulation pipe;
a third circulation pipe, having first and second ends, extending from said lower end of said second circulation pipe outwardly through heat exchanger, through said second containment member and into said interior compartment of said nuclear reactor vessel;
a turbine positioned in said interior compartment of said first containment member;
said turbine having an inlet pipe extending from said heat exchanger to said turbine;
an electrical generator positioned in said interior compartment of said first containment member which is driven by said turbine;
a condenser positioned in said interior compartment of said first containment member;
a first return pipe extending from said turbine to said condenser;
a second return pipe extending from said condenser to said heat exchanger;
said condenser being in valved communication with the source of water; and
said condenser being in valved communication with the exterior of said first containment member.

2. The underground double containment nuclear reactor of claim 1, wherein said source of water is positioned above said nuclear reactor vessel.

3. The underground double containment nuclear reactor of claim 1, further comprising at least one cooling tube assembly having upper and lower ends, the at least one cooling tube assembly extends from an upper section of said nuclear reactor vessel, downwardly in said interior compartment of said second containment member, to a lower section of said nuclear reactor vessel.

4. The underground double containment nuclear reactor of claim 3, wherein at least one valve is imposed in said at least one cooling tube assembly at said upper end thereof and wherein at least one valve is imposed in said at least one cooling tube assembly at said lower end thereof.

5. The underground double containment nuclear reactor of claim 1, wherein said lower section of said second containment member is positioned on said bottom wall of said first containment member.

6. The underground double containment nuclear reactor of claim 1, wherein said source of water is a water tank.

7. The underground double containment nuclear reactor of claim 1, wherein said source of water is a body of water.

8. The underground double containment nuclear reactor of claim 1, further comprising a radiation filter which is in communication with said interior compartment of said second containment member.

9. The underground double containment nuclear reactor of claim 1, further including a radiation filter which is in communication with said interior compartment of said first containment member.

10. The underground double containment nuclear reactor of claim 9, wherein a vent pipe extends from said radiation filter to the atmosphere.

11. The underground double containment nuclear reactor of claim 8, wherein a vent pipe extends from said radiation filter to the atmosphere.

12. The underground double containment nuclear reactor of claim 1, wherein a water outlet pipe is positioned in said upper section of said second containment member with said water outlet pipe being in fluid communication with said interior compartment of said first containment member.

13. The underground double containment nuclear reactor of claim 1, wherein at least one valve is positioned in said first circulation pipe.

14. The underground double containment nuclear reactor of claim 1, wherein at least one valve is positioned in said third circulation pipe.

* * * * *